United States Patent [19]
Alouani et al.

[11] Patent Number: 5,214,433
[45] Date of Patent: May 25, 1993

[54] TWO-STAGE TARGET TRACKING SYSTEM AND METHOD

[75] Inventors: Ali B. T. Alouani, Knoxville, Tenn.; William D. Blair; Theodore R. Rice, both of Fredericksburg, Va.

[73] Assignee: The United States of America as represented by the Secretary of the Navy, Washington, D.C.

[21] Appl. No.: 899,803

[22] Filed: Jun. 17, 1992

[51] Int. Cl.$^5$ .......................... G01S 13/66; G01S 13/72
[52] U.S. Cl. ...................................... 342/95; 342/101; 342/195
[58] Field of Search .................. 342/96, 67, 96, 195, 342/196, 101

[56] References Cited

U.S. PATENT DOCUMENTS

| | | | |
|---|---|---|---|
| 3,935,572 | 1/1976 | Broniwitz et al. | 342/80 |
| 4,050,068 | 9/1977 | Berg et al. | 342/53 |
| 4,128,837 | 12/1978 | Page | 342/67 |
| 4,148,029 | 4/1979 | Quesinberry | 343/9 |
| 4,179,696 | 12/1979 | Quesinberry et al. | 342/75 |
| 4,320,287 | 3/1982 | Rawicz | 235/412 |
| 4,345,252 | 8/1982 | Carre et al. | 342/91 |
| 4,450,446 | 5/1984 | Clancy et al. | 342/98 |
| 4,673,938 | 6/1987 | Phillips et al. | 342/95 |
| 4,751,511 | 6/1988 | Komata et al. | 342/59 |
| 4,760,397 | 7/1988 | Piccolrauz | 342/75 |
| 4,783,744 | 11/1988 | Yueh | 364/454 |
| 4,839,658 | 7/1989 | Kathol et al. | 342/455 |
| 4,855,932 | 8/1989 | Cangiani et al. | 364/516 |
| 4,949,236 | 8/1990 | Yeh et al. | 364/148 |
| 4,954,837 | 9/1990 | Baird et al. | 342/458 |
| 4,959,800 | 9/1990 | Wooley | 364/516 |
| 4,989,186 | 1/1991 | Ricker | 367/97 |
| 5,003,313 | 3/1991 | Doriath | 342/152 |
| 5,019,824 | 5/1991 | Kumar | 342/195 |
| 5,051,751 | 9/1991 | Gray | 342/107 |
| 5,113,193 | 5/1992 | Powell et al. | 342/25 |
| 5,115,246 | 5/1992 | Thomas, Jr. et al. | 342/195 |

*Primary Examiner*—John B. Sotomayor
*Attorney, Agent, or Firm*—John D. Lewis; Jacob Shuster

[57] ABSTRACT

An apparatus and method for tracking maneuvering and non-maneuvering targets in the presence of stochastic acceleration are provided. The apparatus and method utilize a two-stage Kalman estimator, the first stage of which is a bias-free filter providing target position and velocity estimates, and the second stage of which is a bias filter providing estimates of target acceleration. These two filters act together to provide parallel processing calculations thereby achieving high speed target state determination. During target maneuvers, the output of the second stage is used to correct the output of the first stage. In the absence of maneuver, the second stage is turned off and the first stage provides the target position and velocity estimates.

5 Claims, 5 Drawing Sheets

|  | A | B | C | D |
|---|---|---|---|---|
|  | n = 6<br>p = 3<br>m = 3 | n = 6<br>p = 6<br>m = 2 | n = 10<br>p = 47<br>m = 7 | n = 10<br>p = 10<br>m = 2 |
| TWO-STAGE KALMAN ESTIMATOR | 1701 | 2184 | 146787 | 8320 |
| STANDARD KALMAN FILTER | 2079 | 3084 | 201083 | 12220 |
| PERCENTAGE SAVED | 18.2 | 29.2 | 27.0 | 31.9 |

FIG. 5

TWO-STAGE TARGET TRACKING SYSTEM AND METHOD

ORIGIN OF THE INVENTION

The invention described herein was made in the performance of official duties by a Navy contractor from Tennessee Technological University in conjunction with two employees of the Department of the Navy. This invention may be manufactured, used, licensed by or for the Government for any governmental purpose without payment of any royalties thereon.

FIELD OF THE INVENTION

The present invention relates generally to target trackers for weapon systems and more specifically to trackers that use Kalman estimators.

BACKGROUND OF THE INVENTION

Prior art systems for target tracking involve estimating the state of a linear system in the presence of measurement and model uncertainties. These uncertainties may result from instrumentation sources and a part of the system state whose behavior is unknown. These unknown behaviors may be represented as a bias vector. In the restricted case where the bias is defined as the acceleration of a target, the following results hold. Non-maneuvering targets can be accurately tracked with a constant velocity filter. To keep the performance of the filter satisfactory, it is necessary to treat the bias as part of the system state. This will lead to an augmented state filter model. However, the computational cost increases with the dimension of the filter. Because of this added cost, many targeting systems simply use a constant velocity target model and ignore any unknown bias, that is, acceleration of the target.

However, when the target maneuvers, the accuracy of the position and velocity estimates provided by a constant velocity filter can degrade significantly. Furthermore, for a target undergoing a large maneuver, the target track may be lost because the constant velocity filter assumes target dynamics whose acceleration is zero-mean. To reduce the effect of the model's mismatch problem, the target acceleration is included as part of the target state in some tracking systems. A system using this approach of a constant acceleration model is capable of tracking maneuvering targets. However, such a filter provides less accurate estimates than the constant velocity filter when the target is not maneuvering. In addition, a constant acceleration model is significantly more expensive in terms of computational time and memory than the constant velocity model.

Another approach to tracking maneuvering targets is the variable dimension (VD) filter. In this approach, a constant velocity filter is used until a maneuver is detected. Then the filter state is augmented to include the acceleration as part of the state and the tracking is performed with the augmented state model until the maneuver disappears. At that time, a constant velocity filter is used again. This approach allows better tracking performance in both maneuvering and non-maneuvering situations than the use of either a constant velocity or a constant acceleration model alone. However, this approach has its disadvantages also. First, when the filter switches models, it goes through a transient period in which target estimates are poor. Second, the refiltering of measurements stored before the maneuver was detected result in a processing delay and a large peak demand for computations. As a result, the variable dimension filter is not suitable for real time combat systems. Third, the acceleration must approach zero before the filter model can be switched from the constant acceleration model to the constant velocity model. Since the acceleration estimates have a slower response to a maneuver than the velocity estimates, the switch to constant velocity filtering will be significantly delayed. Fourth, the use of the augmented state filter is expensive in terms of computation time and memory. Because of these shortcomings, it is clear that another approach to the problem of accurately tracking maneuvering targets is needed.

SUMMARY OF THE INVENTION

It is an object of the invention to provide a target tracking system capable of accurately tracking constant velocity targets.

It is another object of the invention to provide a target tracking system capable of tracking maneuvering targets.

It is yet another object of the invention to provide a target tracking system capable of providing real time position and velocity for both maneuvering and non-maneuvering targets.

It is still another object of the invention to provide a target tracking system capable of maintaining system lock during target maneuver with high rate and magnitude changes in angular and radial velocities.

It is a further object of the invention to provide a target tracking system having reduced computational complexity.

It is a further object of the invention to provide a target tracking system having an independent determination of target acceleration and velocity.

The invention is a target tracking system and method using two, parallel, reduced-order, decoupled filters. The system has a conventional target tracking sensor, and conventional displays for the pilot. Angle track and range data from the tracking sensor is processed in the filtering section. Maneuver detection is accomplished using a maneuver detection thresholding circuit. The first filter uses a constant velocity target model and estimates the target position and velocity in the absence of acceleration. The second filter estimates the target acceleration. The output of the acceleration filter is used to correct the output of the constant velocity filter when a maneuver is detected.

BRIEF DESCRIPTION OF THE DRAWINGS

These and other features, objects, and advantages of the present invention will be better appreciated from an understanding of the operative principles of a preferred embodiment as described hereinafter and as illustrated in the accompanying drawings wherein:

FIG. 5 is a chart showing relative performance of the two-stage tracker in comparison to a variable-dimension filter.

DETAILED DESCRIPTION OF THE INVENTION

Figure 1:
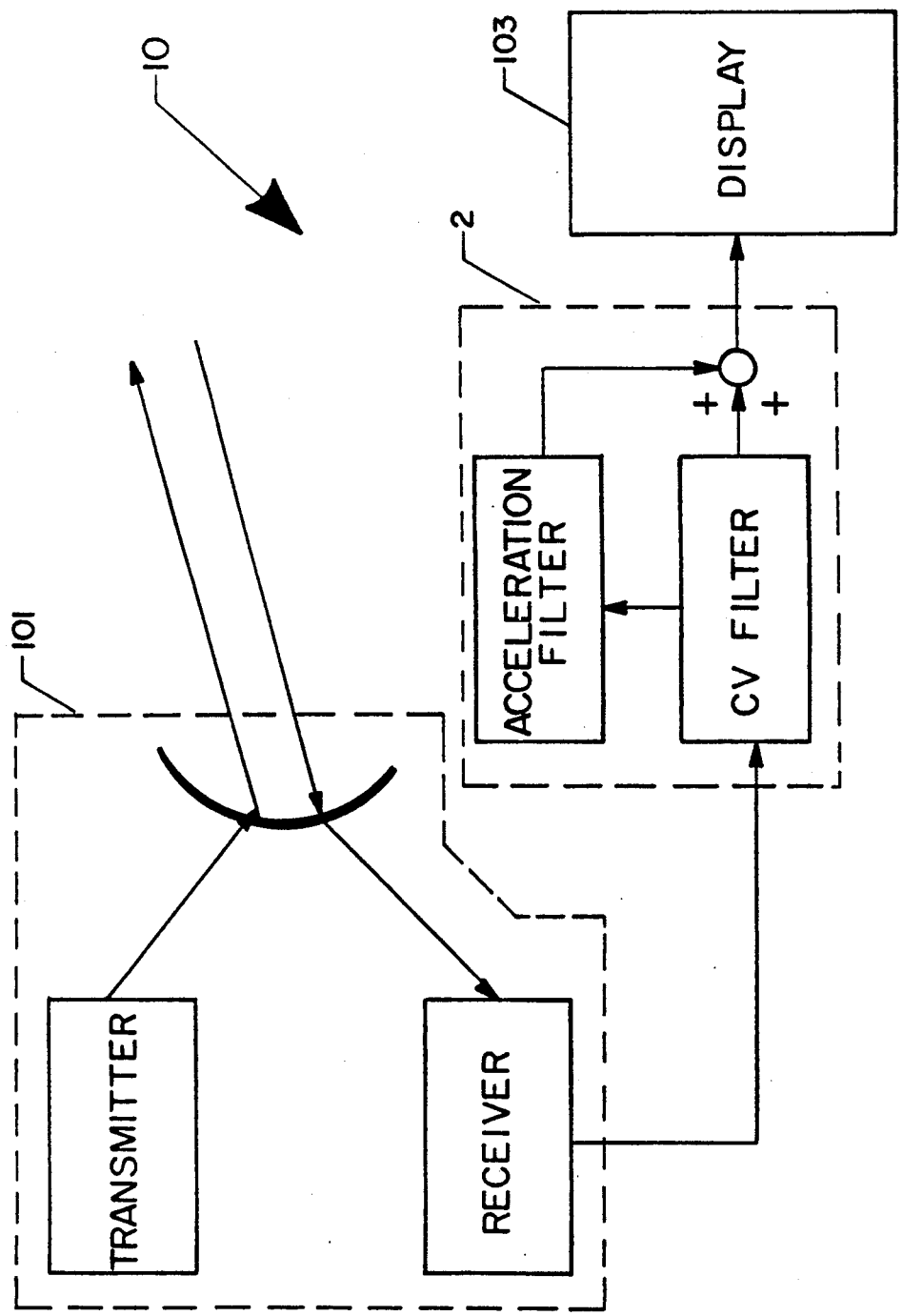
FIG. 1 is a block diagram of the overall target tracking system.

Referring now to FIG. 1, the two-stage target tracking system, designated generally by the reference numeral 10, is shown with three major components, the target tracking sensor system 101, the display 103, and the two-stage target estimator 2. The tracking sensor system may be any of the conventionally known emitter-receiver devices such as a radar or laser tracker or other electro-optic device.

Figure 2:
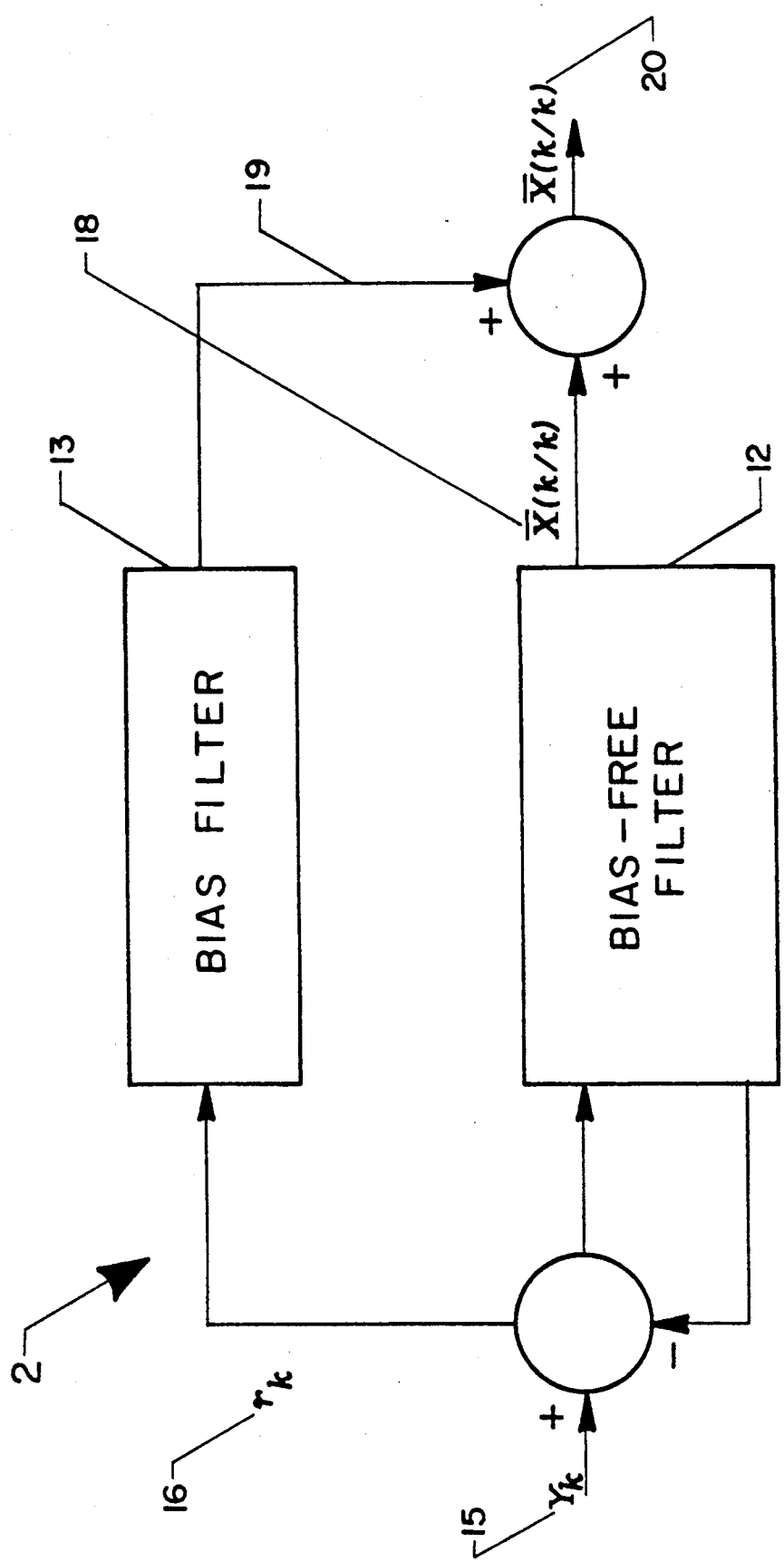
FIG. 2 is a block diagram of a two-stage Kalman filter.

The two-stage target estimator 2 is further illustrated in FIG. 2 with its major functional elements. When a target maneuvers, the quality of the position and velocity estimates degrade significantly where only a constant velocity filter is used. In order to avoid this problem, a two-stage filter 2 is designed having a mathematical equivalence to an augmented state Kalman filter. The design is based on a linear system whose dynamics are modeled by $$X_{k+1} = A_k X_k + B_k \gamma_k + W_k^x, \quad (1)$$

$$\gamma_{k+1} = D_k \gamma_k + W_k^\gamma, \quad (2)$$

where $X_k$ represents the target position and velocity, and $\gamma_k$ represents target acceleration, respectively. The $W_k^x$ is a white Gaussian process with zero mean and covariance $Q_k^x$.

The first stage is of dimension n and produces the state estimate as if the bias filter were nonexistent and is called the bias-free filter 12. The second stage, which is of dimension p, produces an estimate of the bias vector and is called the bias filter 13. The output of the bias-free filter $\overline{X}(k|k)$ 18 can be corrected with the output 19 of the bias filter as shown in FIG. 2, where $Y_k$ is the measurement vector, $r_k$ 16 is the bias-free residual, and $X(k|k)$ 20 is the corrected state estimate. This two-stage estimator is the mathematical equivalent of an augmented state Kalman filter as more fully detailed in the Naval Surface Warfare Center Technical Report NAVSWC TR 91-259 which is incorporated herein by reference.

The method of building a two-stage estimator 2 is as follows. First, ignore the bias term, to obtain the bias-free filter 12. Second, consider the bias term and build a filter whose input is the innovations of the bias-free filter 12 and output 19 is the bias estimate. This is the bias filter 13. These two filters provide the two-stage Kalman estimator. For target tracking applications, the bias-free filter corresponds to the constant velocity filter and the bias filter is the acceleration filter.

Figure 4:
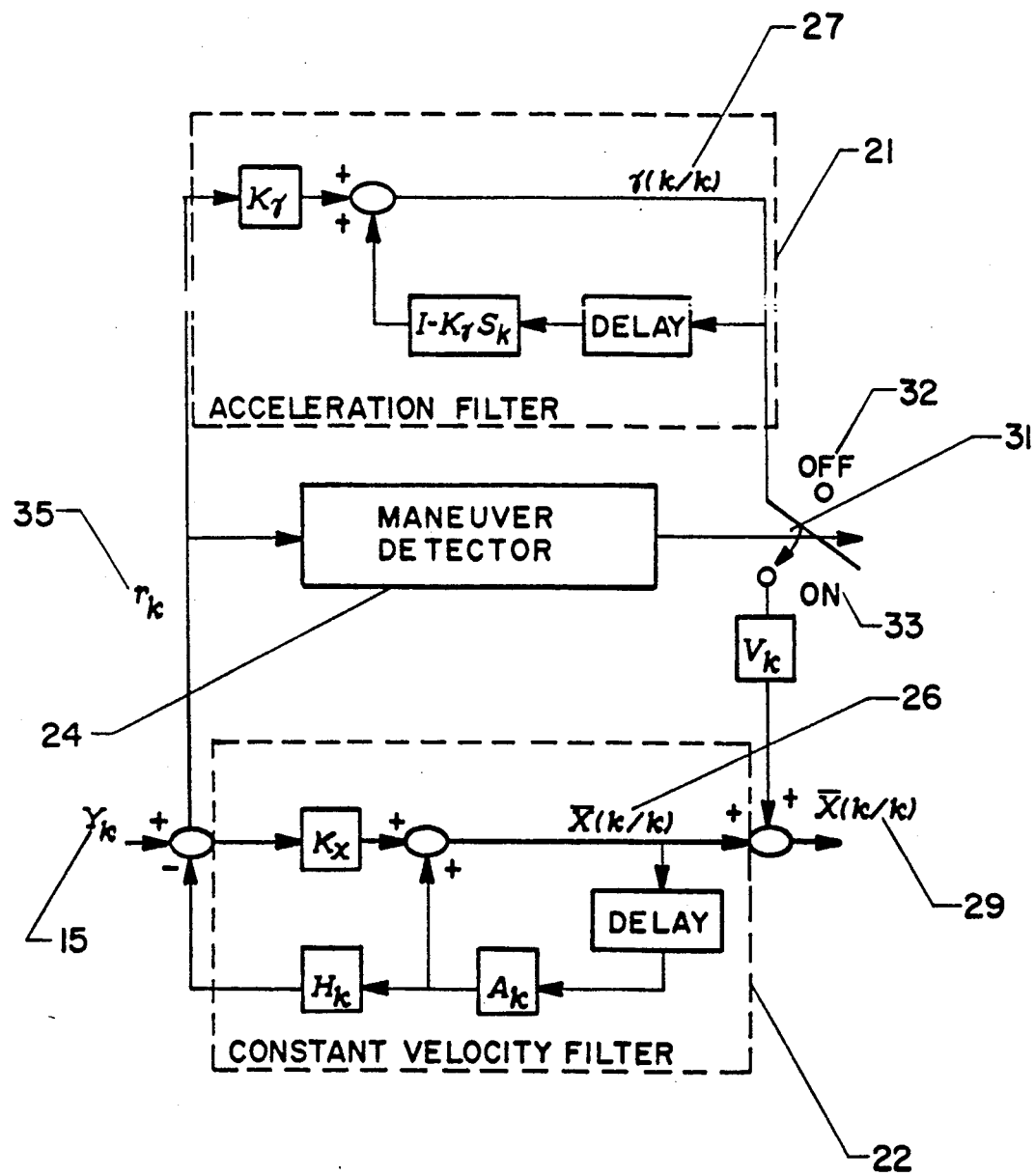
FIG. 4 is a schematic of the functional components of the two-stage target tracker.

When the target is moving at a constant velocity, the tracking filter is a constant velocity filter given by $$\overline{X}(k \mid k-1) = A_{k-1}\overline{X}(k-1 \mid k-1), \quad (3)$$

$$\overline{X}(k \mid k) = \overline{X}(k \mid k-1) + \overline{K}_x(k)[Y_k - H_k\overline{X}(k \mid k-1)], \quad (4)$$

$$\overline{P}_x(k+1|k) = A_k \overline{P}_x(k \mid k)A_k^T + \overline{Q}_k^x \quad (5)$$

$$\overline{P}_x(k \mid k) = [I - \overline{K}_x(k)H_k]\overline{P}_x(k \mid k-1) \quad (6)$$

$$\overline{K}_x(k) = \overline{P}_x(k \mid k-1)H_k^T[H_k\overline{P}_x(k \mid k-1)H_k^T + R_k]^{-1}, \quad (7)$$

where $\overline{X}(k|k)$ is the constant velocity filter estimate, and $\overline{Q}_k^x$ is yet to be determined. In this case, even though the target is assumed to travel at a constant velocity ($\gamma = 0$), $W_k^x$ is still needed to account for modeling uncertainties. The constant velocity filter as shown in FIG. 4 with the maneuver switch 31 in the off position 32, is used until a maneuver is detected.

When a maneuver is detected, the following filter (bias filter) is used to produce the acceleration estimate;

$$\overline{\gamma}(k \mid k-1) = D_{k-1}\overline{\gamma}(k-1 \mid k-1) \quad (8)$$

$$\overline{\gamma}(k \mid k) = \overline{\gamma}(k \mid k-1) + \overline{k}_\gamma(k)(Y_k - H_k\overline{X}(k \mid k-1) - S_k\overline{\gamma}(k \mid k-1)), \quad (9)$$

$$\overline{P}_\gamma(k+1|k) = D_k\overline{P}_\gamma(k \mid k)D_k' + G_k^\gamma Q_k^\gamma G_k^{\gamma\prime}, \quad (10)$$

$$K_\gamma(k) = \overline{P}_\gamma(k \mid k-1)S_k'[S_k\overline{P}_\gamma(k \mid k-1)S_k' + H_k\overline{P}_x(k \mid k-1)H_k' + R_k]^{-1}, \quad (11)$$

$$\overline{P}(k \mid k) = (I - \overline{K}_\gamma(k)S_k)\overline{P}_\gamma(k \mid k-1), \quad (12)$$

where $$S_k = H_k U_k + C_k, \quad (13)$$

$$U_k = (A_{k-1}V_{k-1} + B_{k-1})D_{k-1}^{-1}, \quad (14)$$

$$V_k = U_k - \overline{K}_x(k)S_k. \quad (15)$$

The $\overline{\gamma}(\cdot)$ is the bias estimate produced by the bias filter, and $\overline{P}_\gamma(\cdot)$ is its error covariance matrix.

The estimate $\overline{X}$ of (4) does not represent the optimal state estimate of the system (1) and (2). A superposition principle-like approach is used to integrate the bias-free and bias estimates to produce the optimal state estimate of the system (1) and (2). The result of this integration leads to the two-stage filter which is discussed next.

Figure 3:
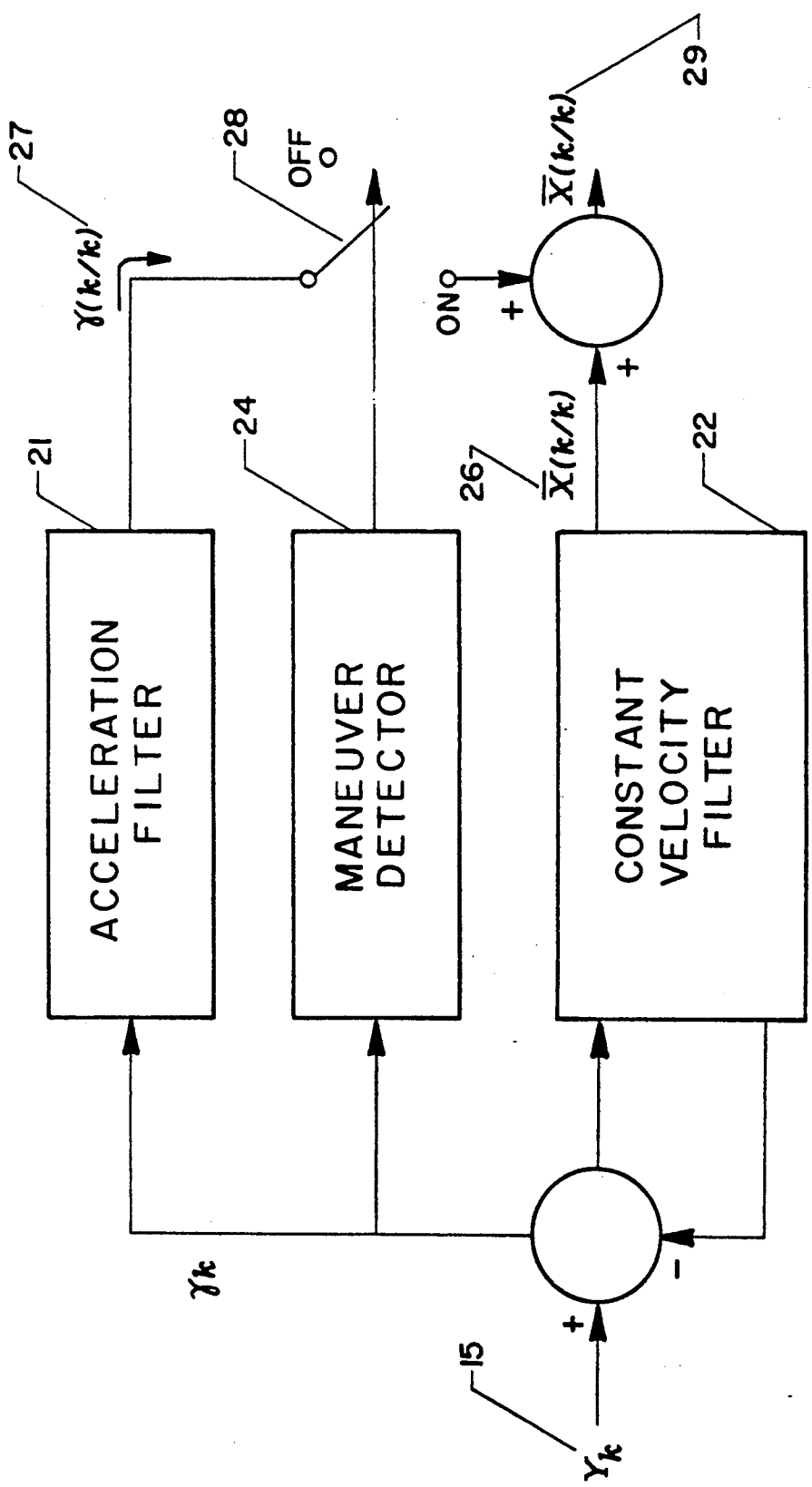
FIG. 3 is a block diagram of a two stage Kalman filter with a maneuver detector circuit.

The following defines a new filtering algorithm which uses the outputs of the bias-free and bias filters and is called the two-stage filter algorithm:

For the preferred embodiment of the present invention, the $$X_c(k \mid k) = \overline{X}(k \mid k) + V_k\overline{\gamma}(k \mid k) \quad (16)$$

$$X_3(k \mid k-1) = \overline{X}(k \mid k-1) + U_k\overline{\gamma}(k \mid k-1) \quad (17)$$

$$P_{11}(k \mid k) = \overline{P}_x(k \mid k) + V_k\overline{P}_\gamma(k \mid k)V_k' \quad (18)$$

$$P_{11}(k+1|k) = \overline{P}_x(k+1|k) + U_{k+1}\overline{P}_\gamma(k+1|k)U_{k+1}' \quad (19)$$

$$P_{12}(k \mid k) = V_k\overline{P}_\gamma(k \mid k) \quad (20)$$

$$P_{12}(k+1|k) = U_{k+1}P_\gamma(k+1|k) \quad (21)$$

$$P_{22}(k \mid k) = \overline{P}_\gamma(k \mid k) \quad (22)$$

$$P_{22}(k+1|k) = \overline{P}_\gamma(k+1|k). \quad (23)$$

bias-free filter corresponds to the constant velocity filter and the bias filter corresponds to the acceleration filter. Referring to FIG. 3, the measurement vector $Y_k$ 15 presents target data from a radar or electro-optic tracker. An acceleration filter 21 is the bias filter previously described. Constant velocity filter 22 is the bias-free filter previously described.

Since the two filters are connected in parallel, the acceleration filter 21 can be turned on or off as needed. When the target moves with a constant velocity, the constant velocity filter 22 is used to estimate the target state. Once a maneuver is detected, the acceleration filter 21 is turned on and its output estimates are used to correct the estimates of the constant velocity filter. To detect the presence of a maneuver, a maneuver detector 24 that utilizes the residuals of the constant velocity filter is used which then closes switch 28. Therefore, the maneuvering target tracker consists of three parallel blocks: constant velocity filter 22, maneuver detector 24, and acceleration filter 21. $\overline{X}(k|k)$ 26 represents the constant velocity filter estimate, $\gamma(k|k)$ 27 is the acceleration estimate, and $\overline{X}(k|k)$ 29 is the optimal estimate of the target position and velocity.

Referring now to FIG. 4, the functional components of the two-stage filter are depicted. Measurement vector 15 is processed by the constant velocity filter 22. The bias-free residuals are used by the acceleration filter 21. When no target maneuvering is detected by the maneuver detector 24, maneuver switch 31 is off and the constant velocity target state $\overline{X}(k|k)$ 26 is provided uncorrected to a weapons display (not shown). In this case the constant velocity target state 26 is equal to the final target state. When target maneuvering is detected, maneuver switch 31 is turned on 33 and acceleration corrections 27 from the acceleration filter 21 are added to the constant velocity state 26 thereby providing a corrected target state 29. Maneuver detection 23 is based on constant velocity filter residuals 35. Because both the acceleration and velocity filters operate continuously, no delay occurs during switch-over from one mode to another. Additionally, the device avoids the problem of recomputation of the stored measurement for the constant velocity filter. Either target state 26 is used alone or target state 26 is corrected by acceleration state 27. This arrangement provides for rapid and uninterrupted target state prediction even though the target repeatedly changes from constant velocity flight to maneuvering flight and back to constant velocity flight.

A comparison of the computational cost of one recursive cycle of an augmented state Kalman filter 41 with the computational cost of the new two-stage filter 42 is shown in the table of FIG. 5. The table shows the number of multiplication and division operations for state dimension n, acceleration dimension p, and measurement dimension m. As an example, column A shows the standard filter 41 requiring 2079 operations 44, while the two-stage filter requires only 1701 operations 45. This difference provides a computational savings 47 of 18.2 percent.

The advantages and benefits of the new filtering approach are numerous. First, because the constant velocity and acceleration filters are decoupled, only the constant velocity filter output is used (the acceleration filter is turned off or its output is not used) when the target is not maneuvering thereby providing good noise reduction. Second, when a maneuver is detected, only the acceleration filter is used to process the stored residual data and the output of the constant velocity filter needs only to be corrected at the current time using the current acceleration estimate because both filters are decoupled. Thus, significant computational savings relative to the VD filter are achieved at maneuver detection, and the processing time of the stored measurements is reduced because the stored measurements are processed with the acceleration filter only. Therefore, the new filter leads to a faster maneuver response algorithm which is more practical for real-time system than the VD filter. Third, when the maneuver disappears, the acceleration filter is turned off and the tracking with the constant velocity filter resumes naturally again without filter switching. Because the tracking errors of the constant velocity filter are monitored to determine the presence of a maneuver, and because velocity estimates respond faster than acceleration estimates, the end of a maneuver is detected quicker with the two-stage approach than the VD approach. Fourth, during the maneuver, the computational cost of the new filter is less than that of the augmented state filter because the new filter uses two reduced-order filters in a parallel structure.

Although the invention has been described relative to a specific embodiment thereof, there are numerous variations and modifications what will be readily apparent to those skilled in the art in the light of the above teachings. It is therefore to be understood, within the scope of the appended claims, the invention may be practiced other than as specifically described.

What is claimed as new and desired to be secured by Letters Patent of the United Sates is:

1. A target tracking system for maneuvering and non-maneuvering targets comprising:
   a target tracking sensor;
   a two-stage Kalman estimator receiving target position and velocity from said target tracking sensor and estimating corrected target velocity and acceleration using a bias-free filter stage for providing target position and velocity estimates and a decoupled, bias filter for providing target acceleration estimates; and
   a target display system connected to and receiving corrected target data from said two-stage Kalman estimator.

2. A target tracking system as in claim 1 wherein said target tracking sensor comprises a radar transmitter and receiver.

3. A target tracking system as in claim 1 wherein said target tracking sensor comprises an electro-optic tracker.

4. A target tracking system for maneuvering and non-maneuvering target comprising:
   means for sensing target positions and velocity;
   means for correcting target position information functionally connected to and receiving signals from said means for sensing, said means for correcting further comprising means for parallel processing of acceleration data along with simultaneous and decoupled processing of estimated velocity and position data; and
   means for displaying corrected target position information as received for said means for correcting.

5. A method for estimating target position and tracking a maneuvering target comprising the steps of:
   emitting energy for target detection;
   receiving target position and velocity signals;
   reading received signals simultaneously into a constant velocity Kalman filter and into a separate target acceleration Kalman filter;
   providing the output of the constant velocity Kalman filter as a first estimate of target position and velocity;
   detecting target acceleration by measuring the magnitude of residuals for the constant velocity filter alone;
   summing constant velocity and acceleration filter outputs whenever the constant velocity residuals exceed a pre-set value;
   estimating target position and velocity data using the greater of the constant velocity filter outputs or the sum of the constant velocity an acceleration filter outputs; and
   displaying corrected target position and velocity data.

* * * * *